United States Patent
Kumar P et al.

(10) Patent No.: US 11,573,842 B2
(45) Date of Patent: Feb. 7, 2023

(54) RELIABILITY DETERMINATION OF WORKLOAD MIGRATION ACTIVITIES

(71) Applicant: VMWARE, INC., Palo Alto, CA (US)

(72) Inventors: Pramod Kumar P, Bangalore (IN); Keerthi B Kumar, Bangalore (IN); Nitin Madhusudan Agrawal, Bangalore (IN); Shubham Shashikant Patil, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 139 days.

(21) Appl. No.: 17/226,307

(22) Filed: Apr. 9, 2021

(65) Prior Publication Data
US 2021/0255904 A1 Aug. 19, 2021

Related U.S. Application Data

(62) Division of application No. 16/134,993, filed on Sep. 19, 2018, now Pat. No. 10,990,452.

(30) Foreign Application Priority Data

Jul. 24, 2018 (IN) .............................. 201841027808

(51) Int. Cl.
| | | |
|---|---|---|
| G06F 9/50 | (2006.01) | |
| G06F 11/07 | (2006.01) | |
| G06N 7/00 | (2006.01) | |
| G06K 9/62 | (2022.01) | |
| G06N 20/00 | (2019.01) | |

(52) U.S. Cl.
CPC .......... *G06F 9/5088* (2013.01); *G06F 9/5066* (2013.01); *G06F 11/079* (2013.01); *G06K 9/6218* (2013.01); *G06K 9/6256* (2013.01); *G06N 7/00* (2013.01); *G06N 20/00* (2019.01)

(58) Field of Classification Search
CPC .... G06F 9/5088; G06F 11/079; G06F 9/5066; G06N 20/00; G06N 7/00; G06K 9/6256; G06K 9/6218
See application file for complete search history.

(56) References Cited

U.S. PATENT DOCUMENTS

| | | | | |
|---|---|---|---|---|
| 2016/0057041 | A1* | 2/2016 | Gupta | H04L 41/16 709/224 |
| 2016/0357660 | A1* | 12/2016 | Dean | G06F 8/00 |
| 2017/0109205 | A1* | 4/2017 | Ahuja | G06F 9/5094 |
| 2017/0116626 | A1* | 4/2017 | Ramamoorthy | H04L 41/40 |
| 2019/0325354 | A1* | 10/2019 | Rajnayak | G06K 9/627 |

* cited by examiner

*Primary Examiner* — Sisley N Kim

(57) ABSTRACT

Techniques for determining reliability of a workload migration activity are disclosed. In one embodiment, sub-tasks associated with the workload migration activity may be determined. Further, statistical data associated with an execution of the sub-tasks corresponding to different instances of the workload migration activity may be retrieved. Furthermore, a reliability model may be trained through machine learning using the statistical data to determine reliability of the workload migration activity. Then, the reliability of a new workload migration activity may be determined using the trained reliability model.

13 Claims, 9 Drawing Sheets

RELIABILITY DETERMINATION OF WORKLOAD MIGRATION ACTIVITIES

CROSS-REFERENCES TO RELATED APPLICATIONS

This application is a Divisional of patent application Ser. No. 16/134,993 entitled "RELIABILITY DETERMINATION OF WORKLOAD MIGRATION ACTIVITIES", filed on Sep. 19, 2018, which claims the benefit under 35 U.S.C. 119(a)-(d) to Indian Application number 201841027808 entitled "RELIABILITY DETERMINATION OF WORKLOAD MIGRATION ACTIVITIES" filed on Jul. 24, 2018, by VMware, Inc., which is herein incorporated in its entirety by reference for all purposes.

TECHNICAL FIELD

The present disclosure relates to virtual computing environments, and more particularly to methods, techniques, and systems for determining reliability of workload migration activities in the virtual computing environments.

BACKGROUND

Enterprises have shifted computing needs from enterprise owned and operated computer systems to cloud computing providers. Cloud computing providers may allow enterprises to store and run their applications in a cloud-computing facility. The cloud-computing facility may be composed of numerous racks of servers, switches, routers, and mass data-storage devices interconnected by local-area networks, wide-area networks, and wireless communications that may be consolidated into a single data center or distributed geographically over a number of data centers. Enterprises may run their applications in a cloud-computing facility as virtual machines (VMs) that are consolidated into a virtual data center (VDC) also called as a software defined data center (SDDC). A VDC may recreate the architecture and functionality of a physical data center for running enterprise applications.

Particularly, in such virtual computing environments, a number of SDDCs with each SDDC including multiple host computing systems in a single or multiple cluster environment may have to be managed. In the SDDCs, workloads (e.g., VMs) may be migrated from one physical host computing system to another to achieve load balancing, fault tolerance, and/or high availability. Because of the vast numbers of SDDCs and dynamic nature of SDDCs running in the cloud-computing facility, SDDCs introduce management challenges to information technology (IT) managers. For instance, in case of a workload migration activity, managing and monitoring of such multitenant cloud infrastructure may be a challenge as the reliability of the workload migration activity may be compromised at any point of time. For example, there could be instances like slowdown of the workload migration activity, which may be triggered because of latency in a non-volatile dual in-line memory module (NVDIMM) subsystem. Delays like these may manifest in any component of SDDC. Thus, it may be difficult to identify the root cause of the issue in software and hardware layers. Further, identification of the issues and the root cause of the issues may involve significant effort from the engineering team.

Figure 1:
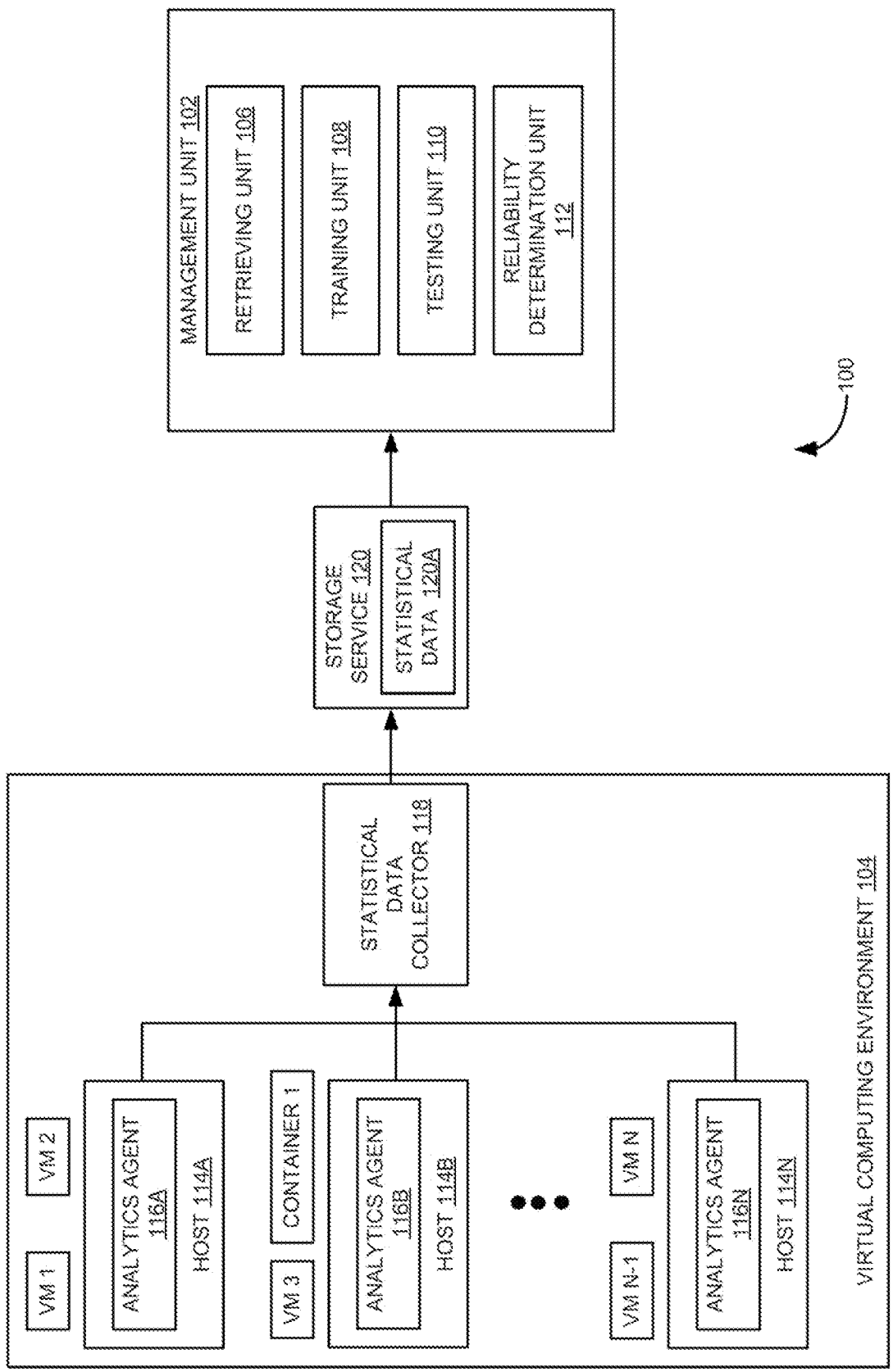
FIG. 1 is a block diagram of an example system for determining reliability of a workload migration activity through supervised learning.

The drawings described herein are for illustration purposes only and are not intended to limit the scope of the present subject matter in any way.

DETAILED DESCRIPTION

Embodiments described herein may provide an enhanced computer-based and network-based method, technique, and system for determining reliability of a workload migration activity in a virtual computing environment. Virtual computing environment may include a number of software-defined data centers (SDDCs) with each SDDC including multiple hosts (i.e., physical host computing systems) executing workloads (e.g., virtual machines (VMs)) running therein. The term "workload migration activity" may refer to migration of workloads running on SDDCs from one physical host to another. An example for workload migration activity may be VMware® VMotion™. VMotion is an enabling technology for creating the dynamic, automated, and self-optimizing data centers.

Further, the workload migrating activity may include multiple sub-tasks such as, but are not limited to, 'total time taken for migration activity', 'time taken for paging in of memory', 'observed bandwidth for disk', 'time taken to load the final checkpoint', and 'time taken to copy VM memory pages to destination'. Management and monitoring of the workload migration activity may be a challenge as the workload migration activity may depend on different sub-tasks executing on different hosts in the SDDCs. Further, the reliability of the workload migration activity in the virtual computing environment may get compromised at any point of time. Thus, it may be difficult to identify issues and a root cause of the issues, particularly, when there are multiple SDDCs in the virtual computing environment.

Some methods may include defining thresholds for monitoring the issues (e.g., health measurements of workload migration activities). With different kinds of workloads running on SDDCs, defining the thresholds may need an information technology (IT) manager to analyze the workloads and customer configuration to get to an exact value. Therefore, defining thresholds may not be feasible when the number of SDDCs significantly increase. For example, setting threshold for VM creation time as 5 minutes may be complex as VM creation time itself can vary depending upon a memory size, a disk size, a number of central processing units (CPUs) that are configured, and the like. In another example, setting a threshold for ping latency as 5 seconds may require the IT manager to check network adapter bandwidth, port characteristics and connection information, and the like.

Examples described herein may determine reliability of a workload migration activity through supervised learning and/or unsupervised learning. In one aspect, examples described herein may determine a plurality of sub-tasks associated with a workload migration activity, retrieve statistical data associated with an execution of the plurality of the sub-tasks corresponding to different instances of the workload migration activity within a period, train a reliability model through machine learning using the statistical data corresponding to a portion of the period to determine reliability of the workload migration activity, and determine the reliability of a new workload migration activity using the trained reliability model. The term "reliability model" may refer to a bot (e.g., a piece of software) that can execute commands to determine the reliability of the new workload migration activity.

In another aspect, examples described herein may determine a plurality of sub-tasks associated with a workload migration activity, retrieve statistical data associated with an execution of the plurality of the sub-tasks corresponding to different instances of the workload migration activity, perform a cluster analysis on the statistical data to generate a pair of clusters, with one cluster including the plurality of sub-tasks that are reliable and other cluster including the plurality of sub-tasks that are unreliable, and determine reliability of a new workload migration activity based on the generated pair of clusters.

Thus, examples described herein may predict reliability of the workload migration activity by detecting early failures of the workload migration activity. Further, examples described herein may sub-classify a category of an issue to identify the root cause of the issue, when the workload migration activity is predicted as unreliable.

System Overview and Examples of Operation

FIG. 1 is a block diagram of an example system 100 for determining reliability of a workload migration activity through supervised learning. As shown in FIG. 1, system 100 may include a virtual computing environment 104, a management unit 102, a statistical data collector 118, and a storage service 120. Further, virtual computing environment 104 may include hosts 114A-N and associated VMs (e.g., VM 1 to VM N) and/or containers (e.g., container 1) hosted by hosts 114A-N. For example, virtual computing environment 104 may include a number of software-defined data centers (SDDCs) with each SDDC including multiple hosts 114A-N in a single or multiple cluster environment.

In one example, hosts 114A-N may be provided by different cloud service providers. For example, cloud service providers may include, but not limited to, Amazon Web Services (AWS), Google Cloud Platform, Windows Azure, OpenStack, or any other cloud computing platform. Each host (e.g., 114A-N) may be operated by a cloud service provider and exposed as a service available to tenants (e.g., account holders), such as enterprises. In some examples, hosts 114A-N may be configured to dynamically provide an enterprise or users with one or more virtual data centers in which a user may provision virtual machines (VMs) or containers, deploy multi-tier applications on VMs or containers, and/or execute the VMs or containers. Hosts (e.g., 114A-N) may include an infrastructure platform upon which virtual computing environment 104 may be executed. The term "multi-tier application" may refer to an application in which different functions of the application are logically separated (e.g., using different VMs and/or VM clusters) to handle different tasks or functions of the application.

In one example, each host (e.g., 114A-N) may be a server such as VMware® ESXi. Further, hosts 114A-N may execute multiple workloads. Example workload may be a VM, a container, or the like. The VMs, in some embodiments, may operate with their own guest operating systems on a physical computing device using resources of the physical computing device virtualized by virtualization software (e.g., a hypervisor, a virtual machine monitor, and the like). In one example, VMs may be created and run in the AWS such as Amazon Elastic Compute Cloud (EC2).

The containers, in some embodiments, may refer to software instances that enable virtualization at an operating system (OS) level. A container is a data computer node that runs on top of a host OS without the need for a hypervisor or separate OS. That is, with containerization, the kernel of the OS that manages each host 114A-N can provide multiple isolated user space instances. These instances, referred to as containers, appear as unique servers from the standpoint of an end user communicating with the containers via a network. However, from the standpoint of the OS that manages hosts 114A-N on which the containers execute, the containers may be user processes that are scheduled and dispatched by the OS.

In some examples, hosts 114A-N may include processing resources/processors and memory to execute the workloads running therein. Example processor can be any custom made or commercially available processor, a central processing unit (CPU), an auxiliary processor among several processors associated with hosts 114A-N, a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by hosts 114A-N. Processors may be configured to execute software stored within associated one of memories, to communicate data to and from the memory, and to generally control operations of hosts 114A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

In one example, hosts 114A-N, statistical data collector 118, storage service 120, and management unit 102 may communicate over communication links (e.g., networks). Example network can be a managed Internet protocol (IP)

network administered by a service provider. For example, network may be implemented using wireless protocols and technologies, such as Wi-Fi, WiMAX, and the like. In other examples, network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

One aspect of virtualization is an ability to migrate workload transparently from one host (e.g., 114) to another in virtual computing environment 104, where the migration of VMs is sometimes referred to as VMotion. With workload migrations, workloads can be dynamically balanced among hosts 114A-N. Also, workload migration may enable hardware maintenance to be performed without service interruption by migrating a workload of a host (e.g., 114A-N) that needs to be shut down. In other examples, workloads may be migrated from one physical host (e.g., 114A-N) to another in order to manage device allocation, provide fault tolerance, and high availability by migrating VMs to effectively utilize underlying physical hardware devices, to replace VMs disabled by physical hardware problems and failures, and to ensure that multiple VMs supporting a high-availability virtual appliance are executing on multiple hosts 114A-N.

Further as shown in FIG. 1, hosts 114A-N may include respective analytics agents 116A-N running therein to record statistical data 120A or production data associated with the execution of different instances of the workload migration activity. Further, each analytical agent 116A-N may cache statistical data 120A based on a retention policy. For example, the workload migration activity may include multiple sub-tasks such as, but are not limited to, a guest trace phase, a precopy phase, and a switch over phase. In the guest trace phase, traces may be placed on guest memory pages to track modifications by a guest during the workload migration activity. In the precopy phase, the VM may continue to run and actively modify its memory state on the source host. During the precopy phase, the memory contents of the VM may be copied from the source host to the destination host in an iterative process. In the switch over phase, the VM may be momentarily quiesced on the source host, a last set of memory changes may be copied to the target host, and the VM may be resumed on the target host. In this example, analytics agents 116A-N may record time taken (i.e., statistical data) to execute each of the sub-tasks in associated hosts 114A-N. Further, the recorded statistical data by analytics agents 116A-N may be composed by statistical data collector 118.

In one example, statistical data collector 118 may gather statistical data associated with different instances of the workload migration activity from hosts 114A-N and publish recorded statistical data 120A to storage service 120. Storage service 120 may store statistical data 120A corresponding to the different instances of the workload migration activity. In one example, statistical data collector 118 may be implemented as a part of virtual computing environment 104 (e.g., as shown in FIG. 1). In other examples, statistical data collector 118 can be implemented external to virtual computing environment 104.

Statistical data collector 118 may be a service running on point of presence (PoP) which can invoke commands for the workload migration activity to analytics agents 116A-N. The PoP may be an appliance which can run outside virtual computing environment 104 and establish a bridge between the components of virtual computing environment 104 and storage service 120. Further, statistical data collector 118 may publish statistical data 120A to storage service 120. Example storage service 120 may be implemented as a Software as a Service (SaaS). Example storage service 120 can implement a message broker functionality (e.g., RabbitMQ). The message broker functionality may allow multiple clients to publish and subscribe topics to exchange information. Further, an adapter for the message broker functionality may allow batch read statistical data from the queue and archive the read statistical data 120A using elasticsearch (e.g., in an Elastic database). For example, the statistical data 120A may be stored or archived in storage service 120 for further analysis by management unit 102.

Management unit 102 may refer to a computing device or computer program (i.e., executing on a computing device) that provides service to the workloads or activities executing on the workloads. In one example, management unit 102 may include a retrieving unit 106, a training unit 108, a testing unit 110, and a reliability determination unit 112.

During operation, retrieving unit 106 may retrieve the statistical data (e.g., statistical data 120A) associated with an execution of the plurality of sub-tasks corresponding to different instances of the workload migration activity. The different instances of the workload migration activity may be executed among hosts 114A-N. In one example, retrieving unit 106 may determine the plurality of sub-tasks of the workload migration activity and retrieve statistical data 120A corresponding to different instances of the workload migration activity from storage service 120.

Training unit 108 may train a reliability model through machine learning using the statistical data corresponding to a portion of the period to determine reliability of the workload migration activity. Further, testing unit 110 may test the trained reliability model against the statistical data corresponding to a remaining portion of the period. Training and testing the reliability model are described in FIG. 2.

Reliability determination unit 112 may determine the reliability of a new workload migration activity using the trained and tested reliability model. In one example, determining the reliability of the new workload migration activity may include determining a reliability score as 0 or 1. The reliability score of 0 may indicate an unreliable workload migration activity and the reliability score of 1 may indicate a reliable workload migration activity. Further, upon determining the new workload migration activity as being unreliable, reliability determination unit 112 may further determine a root cause for the unreliable workload migration activity by sub-classifying the sub-tasks associated with the new workload migration activity using the reliability model. Furthermore, reliability determination unit 112 may determine corrective measures for the unreliable workload migration activity based on the root cause. Thus, examples described herein may build the reliability model that can learn patterns from existing statistical data and use the learning to detect failures and reliability breaches in the workload migration activity.

In one example, retrieving unit 106, training unit 108, testing unit 110, and reliability determination unit 112 may be implemented as engines or modules including any combination of hardware, firmware, programming, or a combination thereof to implement the functionalities described herein. Management unit 102 can be a service process in the management application or can be an appliance running in the data centre to cater multiple management applications in a cloud-based environment. For example, management application may be implemented vSphere virtual center that is offered by VMware. Management application can be provided in a physical server, VM, or container.

In some examples, the functionalities described herein, in relation to instructions to implement functions of retrieving unit 106, training unit 108, testing unit 110, reliability determination unit 112, and any additional instructions described herein in relation to the storage medium, may be implemented as engines or modules including any combination of hardware and programming to implement the functionalities of the modules or engines described herein. The functions of retrieving unit 106, training unit 108, testing unit 110, and reliability determination unit 112 may also be implemented by a respective processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 2A:
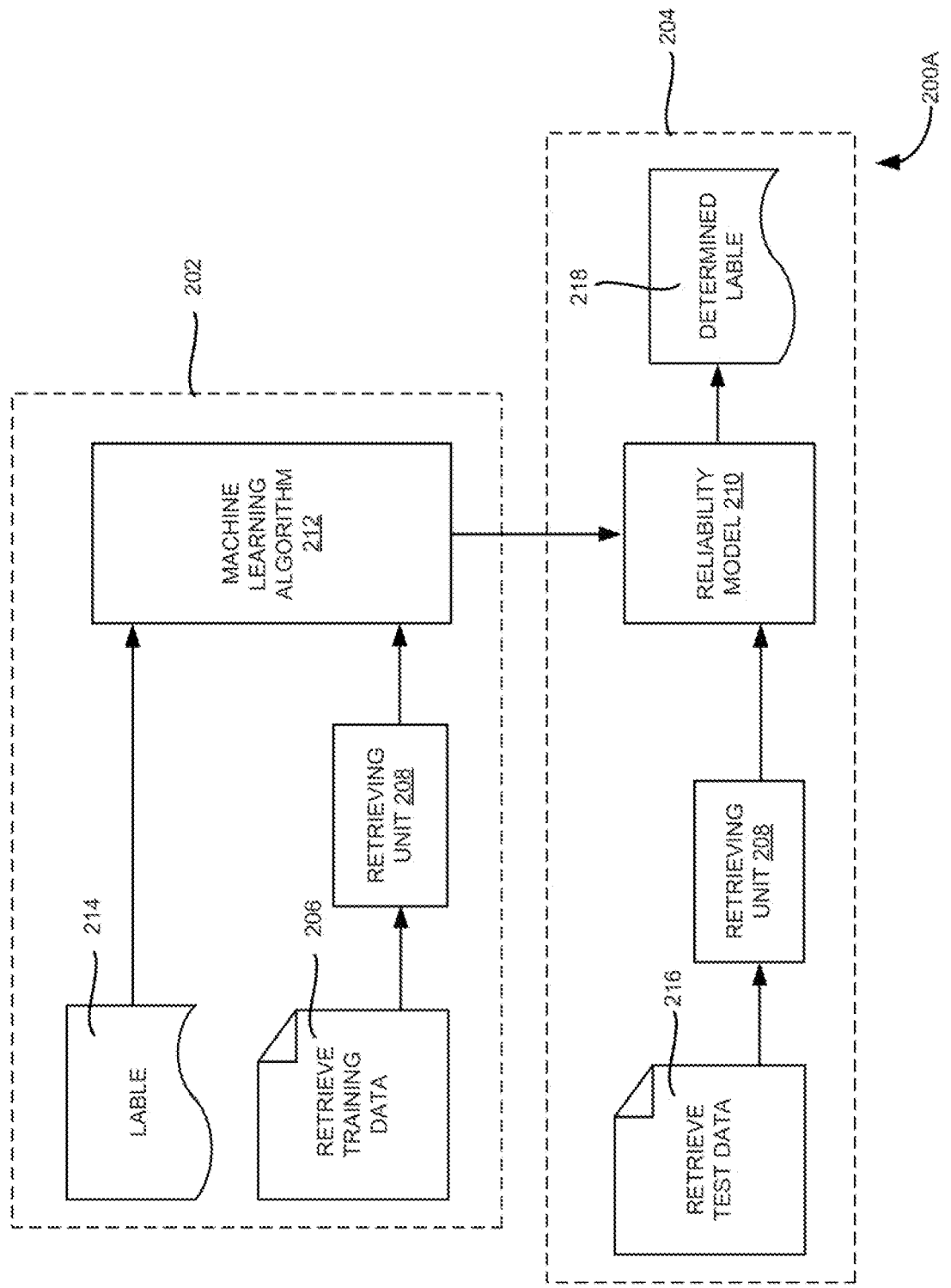
FIG. 2A is a block diagram illustrating an example training phase and an example real-time prediction phase associated with determining reliability of a workload migration activity.

FIG. 2A is an example block diagram 200A illustrating a training phase 202 and a testing phase 204 associated with determining reliability of a workload migration activity. At 206 of training phase 202, training data may be retrieved by a retrieving unit 208 (e.g., retrieving unit 106 of FIG. 1). In one example, sub-tasks associated with the workload migration activity may be determined. Further, statistical data associated with an execution of the sub-tasks may be retrieved corresponding to a period. The statistical data may include an execution time of each sub-task corresponding to the different instances of the workload migration activity. The statistical data may include reliable data and unreliable data associated with each sub-task corresponding to the period.

In one example, the statistical data associated with a portion of the period may be considered as the training data. The statistical data may include, but are not limited to, VMotion time (e.g., total time taken for VMotion (in cycles)), pagin time (e.g., time taken for paging in of memory (in cycles)), svmsetup time (e.g., setup time for the storage VMotion phase), svmcopy time (e.g., copy time for the storage VMotion phase), diskcreate time (e.g., creation time for the VM disk), diskload time (e.g., load time for the VM disk), and precopy time (e.g., time taken to copy VM memory pages to destination) associated with different sub-tasks of the workload migration activity. Example sub-tasks associated with workload migration and the corresponding statistical data or the training data is depicted in Table 1.

TABLE 1

| Sub-tasks | Training data 1 | Training data 2 | Training data 3 | ... | Training data 100 |
|---|---|---|---|---|---|
| VMotion time | 5 s | 6 s | 4 s | ... | 8 s |
| pagin time | 100 ns | 50 ns | 500 ns | ... | 900 ns |
| svmsetup time | 500 ns | 40 ns | 450 ns | ... | 300 ns |
| svmcopy time | 5 ns | 6 ns | 10 ns | ... | 4 ns |
| diskcreate time | 400 ns | 100 ns | 300 ns | ... | 500 ns |
| diskload time | 10 ns | 15 ns | 2 ns | ... | 9 ns |
| precopy time | 3 ns | 6 ns | 5 ns | ... | 10 ns |

In Table 1, there are 7 sub-tasks associated with the workload migration and 100 training data examples. Thus, input matrix size can be 7*100 (i.e., n*m, where n is a number of sub-tasks and m is a number of training data sets or statistical data). In one example, a reliability model 210 may be trained through machine learning using the training data to determine the reliability of the workload migration activity. For example, reliability model 210 may be built or trained through a machine learning algorithm 212 using the training data. Further, different labels (e.g., at 214) such as reliable or unreliable may be provided to machine learning algorithm 212 to train reliability model 210. In the example as depicted in Table 1, the matrix 7*100 may be fed as input matrix to machine learning algorithm 212 to train reliability model 210. The output of reliability model 210 may provide the reliability score of either 0 or 1.

For example, machine learning algorithm 212 can be, but not limited to, a linear classifier, a logistic regression, k-nearest neighbors classifier, and a decision tree. The linear classifier is a polynomial based algorithm. The linear classifier may classify whether the reliability of the workload migration activity is compromised or not. For example, the linear classifier may automatically assign weights for each sub-task of the workload migration activity. For example, using below equation (1), the weights may be learned by reliability model 210. Consider a final value as 5000, if threshold value<5000, then the workload migration activity may be assigned the reliability score of 1 or else the reliability score as 0.

$$\text{weight1*precopy Time} + \text{weight2*SvmcopyTime} + \text{weight3*vmdk load time} \quad (1).$$

In another example, the logistic regression is a probability-based algorithm, where the dataset file is loaded. For example, the logistic regression may split the data into training set and testing set with 80% of the data as training set and 20% of the data as testing set. Reliability model 210 may be built using the logistic regression by passing training data and testing data as the parameters to train reliability model 210 for predicting the reliability of the workload migration activity.

In yet another example, the k-nearest neighbors classifier is a non-parametric method used for classification. The input may consist of the k closest training examples in a feature space and the output may be a class membership. An object is classified by a majority vote of its neighbors, with the object being assigned to the class most common among its k nearest neighbors (e.g., k is a positive integer). If k=1, then the object is simply assigned to the class of that single nearest neighbor. Thus, depending on the closeness of the objects, the given workload migration activity can be determined as reliable or unreliable.

Further, performance of reliability model 210 may be evaluated based on a confusion matrix, where predicted classes represent columns and actual classes represent rows as shown below.

|   | P  | N  |
|---|----|----|
| P | TP | FN |
| N | FP | TN |

Here, T and F denote True and False, and P and N denote Positives and Negatives.

Further, accuracy and precision of trained reliability model 210 may be determined using equations as shown below:

$$\text{Reliability Model Accuracy} = \frac{TP + TN}{\text{Number of tuples in the dataset}}, \text{ and}$$

$$\text{Reliability Model Error} = \frac{FP + FN}{\text{Number of tuples in the dataset}}.$$

At 216, test data (e.g., statistical data corresponding to a remaining portion of the period) may be retrieved by retrieving unit 208 for testing trained reliability model 210. The output of reliability model 210 may be determined or predicted labels (e.g., at 218 as reliable or unreliable). In one example, reliability model 210 may be tested against the test data to determine the accuracy and precision of the prediction by comparing with the determined label with actual label associated with the test data. Determining accuracy of reliability model 210 is explained in FIG. 2B.

Upon testing the accuracy, trained and tested reliability model 210 may be used for real-time predictions. In one example, data input may be received from an analytics agent in a host when the new workload migration activity is triggered. Upon receiving the data input, the reliability of the new workload migration activity may be determined using trained reliability model 210. For example, the reliability of the new workload migration activity may include determining a reliability score as 0 or 1. The reliability score of 0 may indicate an unreliable workload migration activity and the reliability score of 1 may indicate a reliable workload migration activity.

Further, trained reliability model 210 may determine a root cause for the unreliable workload migration activity when the new workload migration activity is determined as being unreliable. In one example, trained reliability model 210 may determine the root cause by sub-classifying the sub-tasks associated with the new workload migration activity. Furthermore, trained reliability model 210 may determine corrective measures for the root cause for the unreliable workload migration activity. For example, when the workload migration activity is determined as unreliable, the reliability model 210 may classify the category to which the problem or issue belongs to like latency in network interface controller (NIC) adapter, latency in precopy phase (e.g., page dirtiness: server (e.g., ESXi) kernel is taking longer time to identify the dirtiness of the pages and time taken to move the pages from source to destination is high), latency issues when loading the VM disks (VMDKs) from disk to memory, and/or VM restart time on the destination host.

Figure 2B:
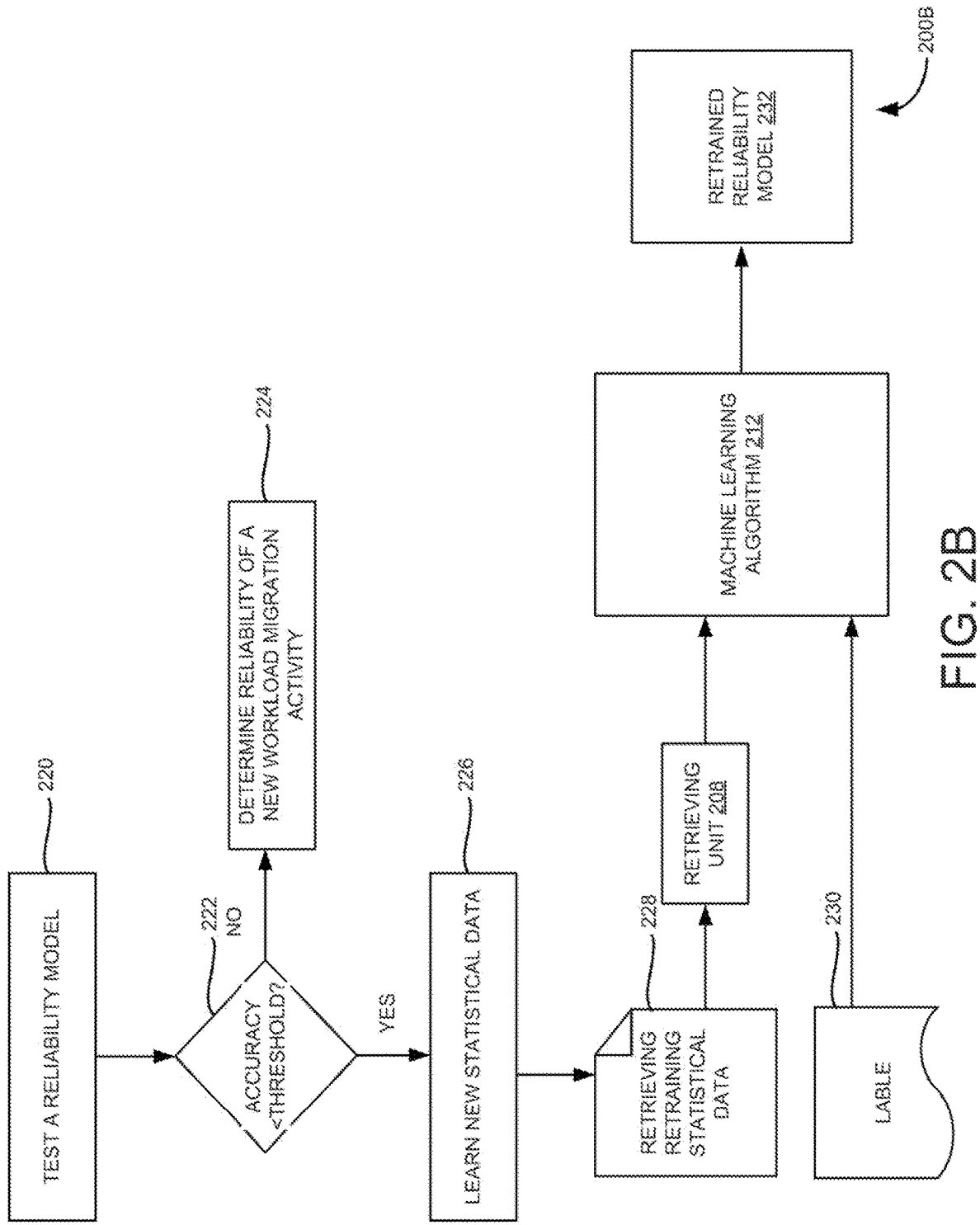
FIG. 2B is a block diagram illustrating an example retraining phase associated with determining the reliability of the workload migration activity.

FIG. 2B is a block diagram illustrating an example retraining phase 200B associated with determining reliability of a workload migration activity. At 220, a reliability model (e.g., reliability model 210 of FIG. 2A) may be tested against the statistical data corresponding to a remaining portion of the period (e.g., test data). At 222, a check is made to determine whether accuracy of reliability model 210 is less than a predetermined threshold.

In one example, the reliability of the workload migration activity may be predicted corresponding to the remaining portion of the period using trained reliability model 210. Further, the accuracy of trained reliability model 210 may be predicted by comparing the predicted reliability with the retrieved statistical data for the remaining portion of the period (i.e., test data). At 224, reliability model 210 may be used or selected to determine the reliability of the new workload migration activity when the determined accuracy of reliability model 210 is greater than or equal to the predefined threshold (e.g., 80%).

When the accuracy is less than the predefined threshold, then a new batch of statistical data may be retrieved to retrain reliability model 210. At 226, new statistical data (e.g., the retraining statistical data 228) may be retrieved by retrieving unit 208 for retraining reliability model 210 when the accuracy is less than the predefined threshold. In one example, reliability model 210 may be retrained with the retraining statistical data 228 (i.e., statistical data associated with a modified period) when the accuracy is less than the predefined threshold. For example, a retrained reliability model 232 may be built or trained through machine learning algorithm 212 using retraining statistical data 228 and associated labels 230 (e.g., reliable or unreliable). Thus, to improve predictions and accuracy, reliability model 210 may be evaluated continuously. Retrained reliability model 232 may then be used for subsequent predictions or determination of reliability of the workload migration activity.

Figure 3:
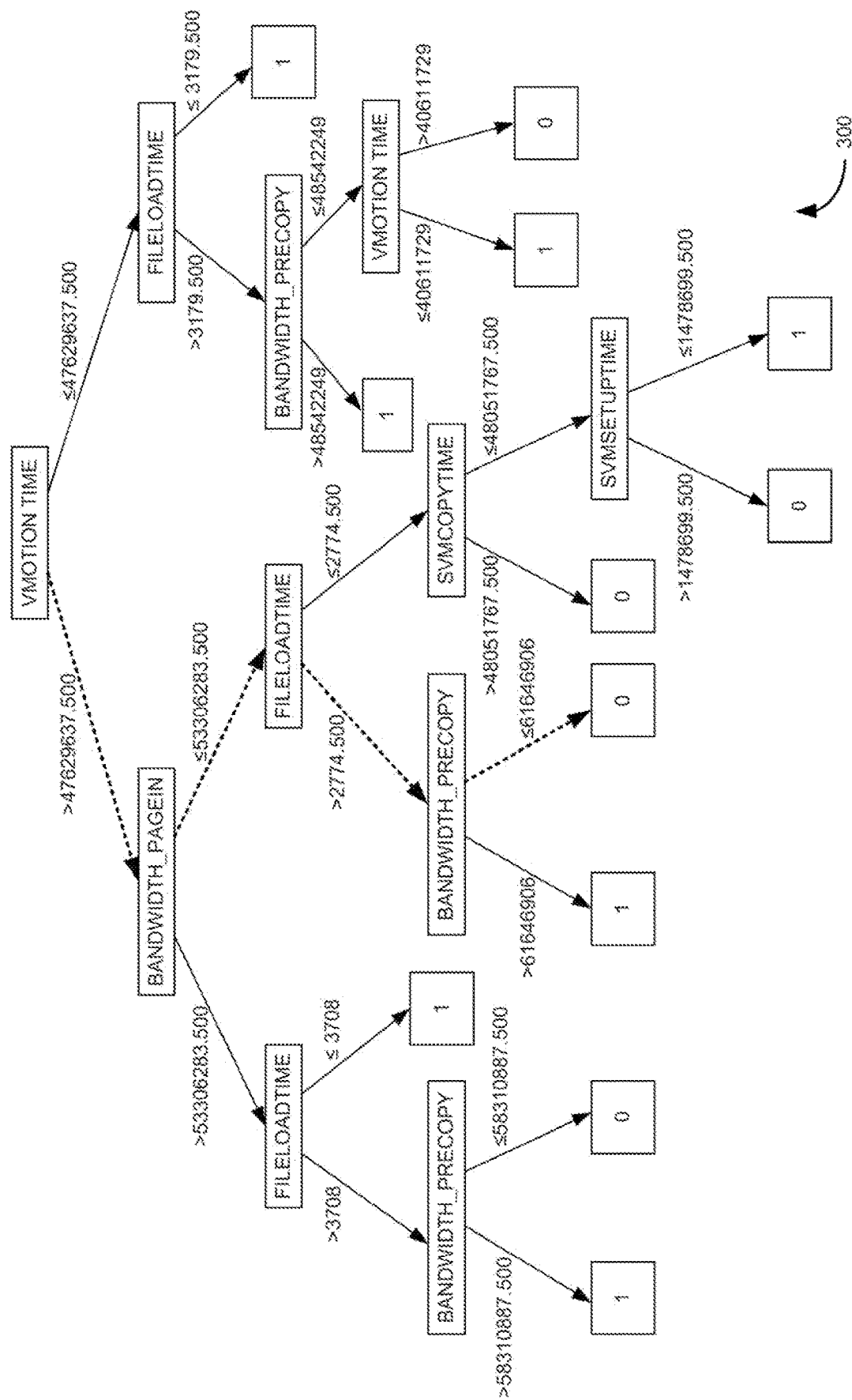
FIG. 3 is a diagrammatic view of an example decision tree to determine reliability of a workload migration activity.

FIG. 3 is an example decision tree 300 to determine reliability of a workload migration activity. Decision tree may visualize workload migration features and identify in which workload migration phase, the reliability has been compromised as shown in FIG. 3. With the decision tree, it may be possible to evaluate the sub-tasks (e.g., VMotion phase) at which the reliability has been compromised.

For example, when a new migration activity is triggered, reliability model 210 may determine a reliability of the new workload migration activity. If the new workload migration activity is determined as unreliable, then the decision tree 300 may evaluate or classify the sub-tasks as shown in FIG. 3. As shown in FIG. 3, the workload migration is failed due to storage and network issues. For example, the storage driver command queue was taking more than 2 secs for each Input/output operation per second (IOPS) (i.e., the reliability of the bandwidth precopy phase is determined as 0 as shown by dotted lines). Particularly, FIG. 3 represents a scenario where a latency in the storage driver command queue processing, which may result in the svm CopyTime and SetupTime.

Figure 4:
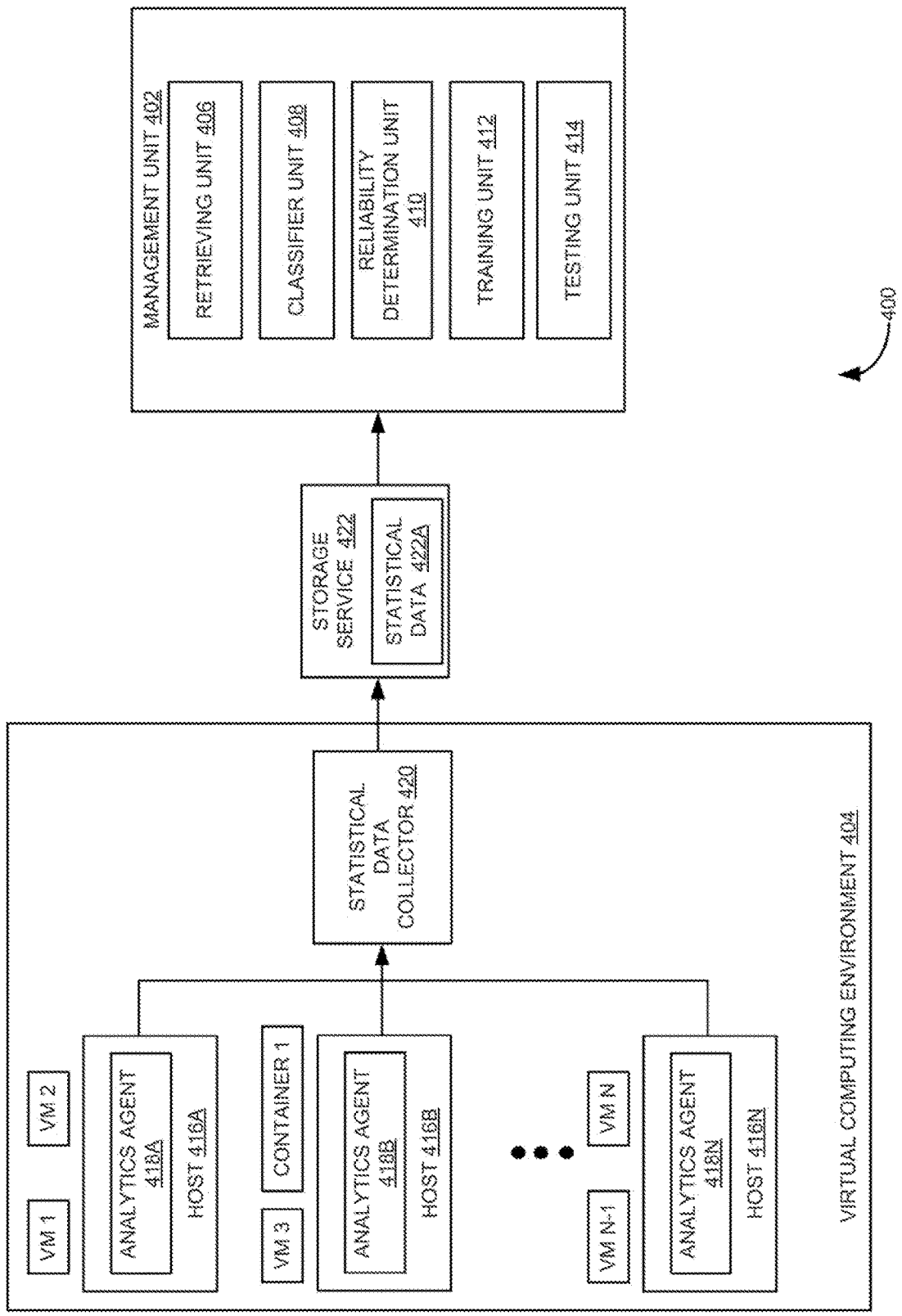
FIG. 4 is a block diagram of an example system for determining reliability of a workload migration activity through unsupervised learning.

FIG. 4 is a block diagram of an example system 400 for determining reliability of a workload migration activity through unsupervised learning. As shown in FIG. 1, system 400 may include a virtual computing environment 404, a management unit 402, a statistical data collector 420, and a storage service 422. Virtual computing environment 404 may include multiple hosts 416A-N (e.g., similar to hosts 114A-N of FIG. 1) including workloads (e.g., VM 1 to VM N and/or container 1) running therein. Further, hosts 416A-N may include respective analytics agents 418A-N running therein. The structure and functionalities of analytics agents 418A-N, statistical data collector 420, and storage service 422 of FIG. 4 may be similar to structure and functionalities of analytics agents 116A-N, statistical data collector 118, and storage service 120 of FIG. 1.

In one example, management unit 402 may include a retrieving unit 406, a classifier unit 408, a reliability determination unit 410, a training unit 412, and a testing unit 414.

During operation, retrieving unit 406 may retrieve statistical data 422A associated with an execution of the plurality of sub-tasks corresponding to different instances of the workload migration activity. The different instances of the workload migration activity may be executed among hosts 416A-N in virtual computing environment 404. In one example, retrieving unit 406 may determine the plurality of sub-tasks associated with the workload migration activity and retrieve statistical data 422A corresponding to different instances of the workload migration activity from storage service 422.

Classifier unit 408 may perform a cluster analysis of the statistical data to generate a pair of clusters, with one cluster including the plurality of sub-tasks that are reliable and other cluster including the plurality of sub-tasks that are unreliable. Reliability determination unit 410 may determine the reliability of a new workload migration activity based on the generated pair of clusters. In one example, cluster analysis may be an unsupervised methodology to classify the data and identify whether the system has compromised reliability or not. Example output of classifier unit 408 is depicted in FIGS. 5A and 5B.

In one example, a combination of supervised (e.g., as described in FIG. 1) and unsupervised (e.g., as described in FIG. 4) algorithms may be used to build a reliability model. For example, the unsupervised algorithms such as cluster analysis (e.g., k-means cluster) may be used to classify in which of the two clusters the statistical data points reside (e.g., say cluster 0 for reliable and cluster 1 for unreliable) and make the clustered data as target 'y'. Further, training unit 412 may train a reliability model through machine learning (i.e, supervised machine learning classification algorithm) based on the generated pair of clusters (i.e., clustered data) to determine the reliability of the workload migration activity. Further, testing unit 414 may test the trained reliability model using test data. In this example, reliability determination unit 410 may determine the reliability of the new workload migration activity using the trained and tested reliability model.

In one example, retrieving unit 406, classifier unit 408, reliability determination unit 410, training unit 412, and testing unit 414 may be implemented as engines or modules including any combination of hardware, firmware, programming, or a combination thereof to implement the functionalities described herein. Management node 402 can be a service process in the management application or can be an appliance running in the data center to cater multiple management applications in a cloud-based environment.

Figure 5A:
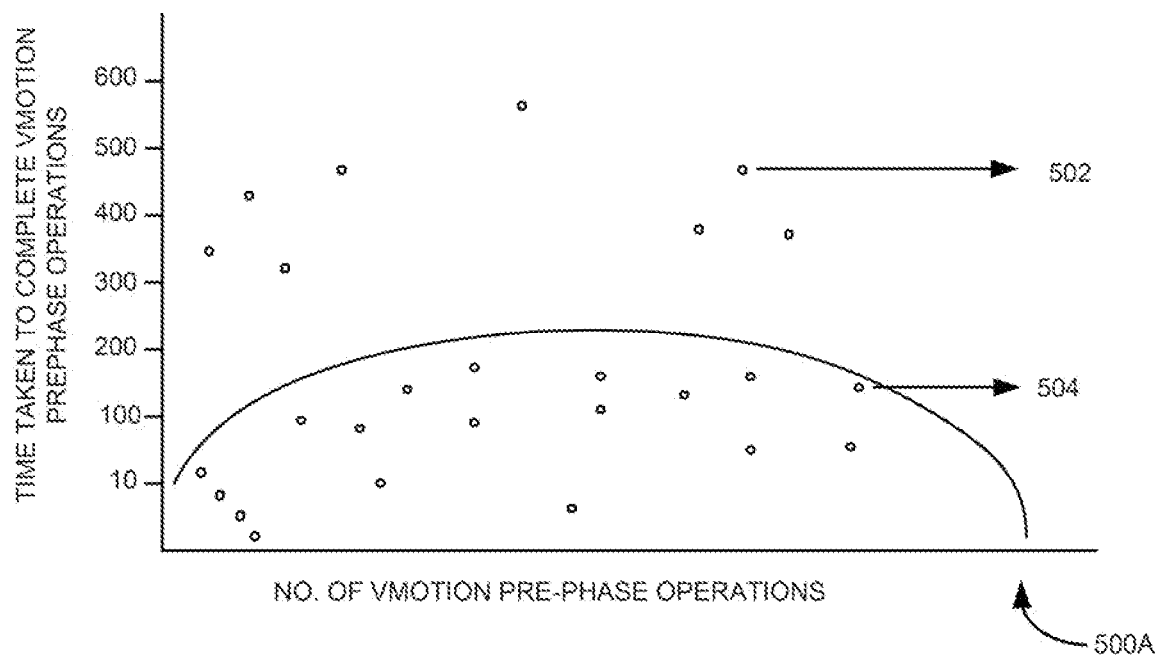
FIG. 5A shows an example graph 500A depicting classification of a single dimension data and corresponding reliability factor based on a cluster analysis.
Figure 5B:
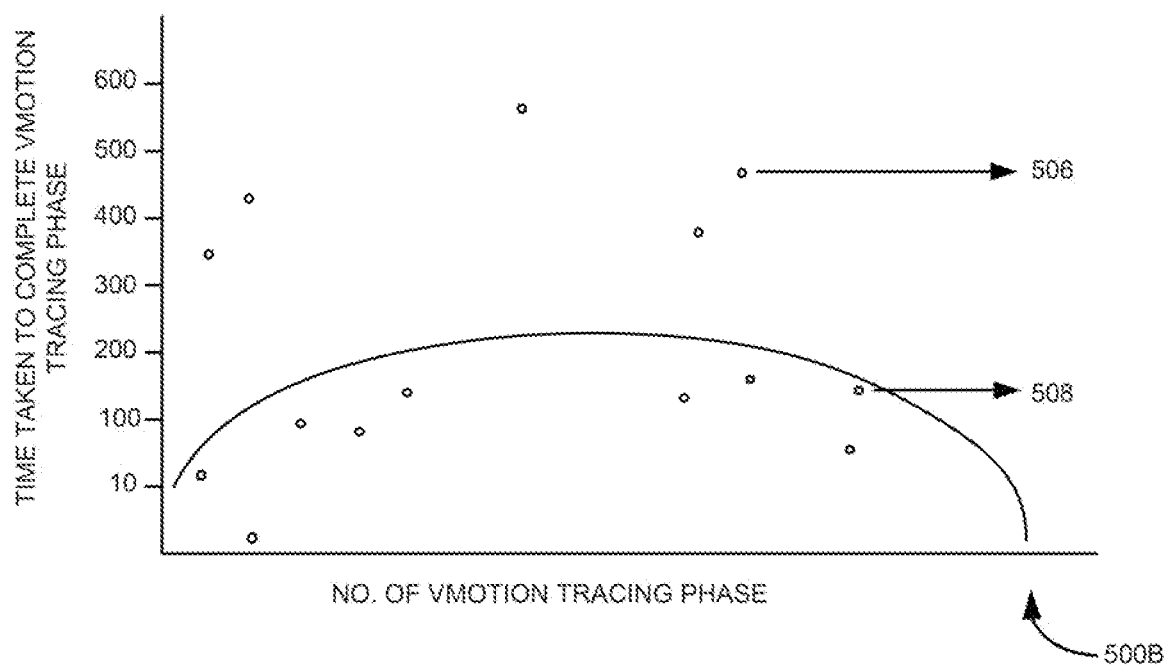
FIG. 5B shows another example graph 500B depicting classification of a single dimension data and corresponding reliability factor based on a cluster analysis.

FIG. 5A shows an example graph 500A depicting classification of a single dimension data and corresponding reliability factor based on a cluster analysis. Graph 500A depicts a number of workload migration pre-phase operations (e.g., a sub-task of a workload migration activity) on x-axis and time taken to complete the workload migration pre-phase operations on y-axis. In one example, classified data by a classifier unit (e.g., classifier unit 408 of FIG. 4) corresponding to the sub-task (i.e., pre-phase operations) is represented in graph 500A. Further, instances of the workload migration pre-phase operations where reliability is compromised (e.g., 502) and reliability is not compromised (e.g., 504) may be graphically depicted in graph 500A.

FIG. 5B shows another example graph 500B depicting classification of a single dimension data and corresponding reliability factor based on a cluster analysis. Graph 500B depicts a number of workload migration tracing operations (e.g., a sub-task of a workload migration activity) on x-axis and time taken to complete workload migration tracing operations. In one example, classified data by a classifier unit (e.g., classifier unit 408 of FIG. 4) corresponding to the workload migration tracing operations is represented in graph 500B. Further, instances of the workload migration tracing operation where reliability is compromised (e.g., 506) and reliability is not compromised (e.g., 508) may be graphically depicted in graph 500B.

Example Processes

Figure 6:
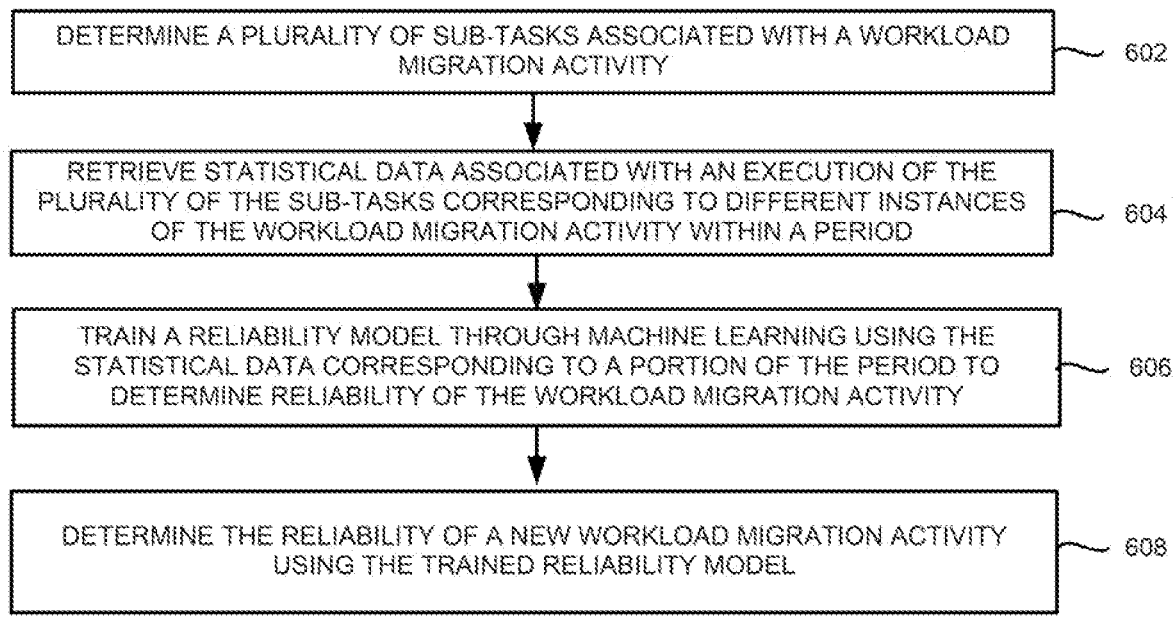
FIG. 6 is an example flow diagram illustrating determining reliability of a workload migration activity through supervised learning in a virtual computing environment.

FIG. 6 is an example flow diagram 600 illustrating determining reliability of a workload migration activity through supervised learning in a virtual computing environment. It should be understood that the process depicted in FIG. 6 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, a plurality of sub-tasks associated with a workload migration activity may be determined. At 604, statistical data associated with an execution of the plurality of the sub-tasks corresponding to different instances of the workload migration activity within a period may be retrieved. At 606, a reliability model may be trained through machine learning using the statistical data corresponding to a portion of the period to determine reliability of the workload migration activity. At 608, the reliability of a new workload migration activity may be determined using the trained reliability model. In one example, the trained reliability model may be tested against the statistical data corresponding to a remaining portion of the period. Further, the trained and tested reliability model may be used to determine the reliability of the new workload migration activity.

Figure 7:
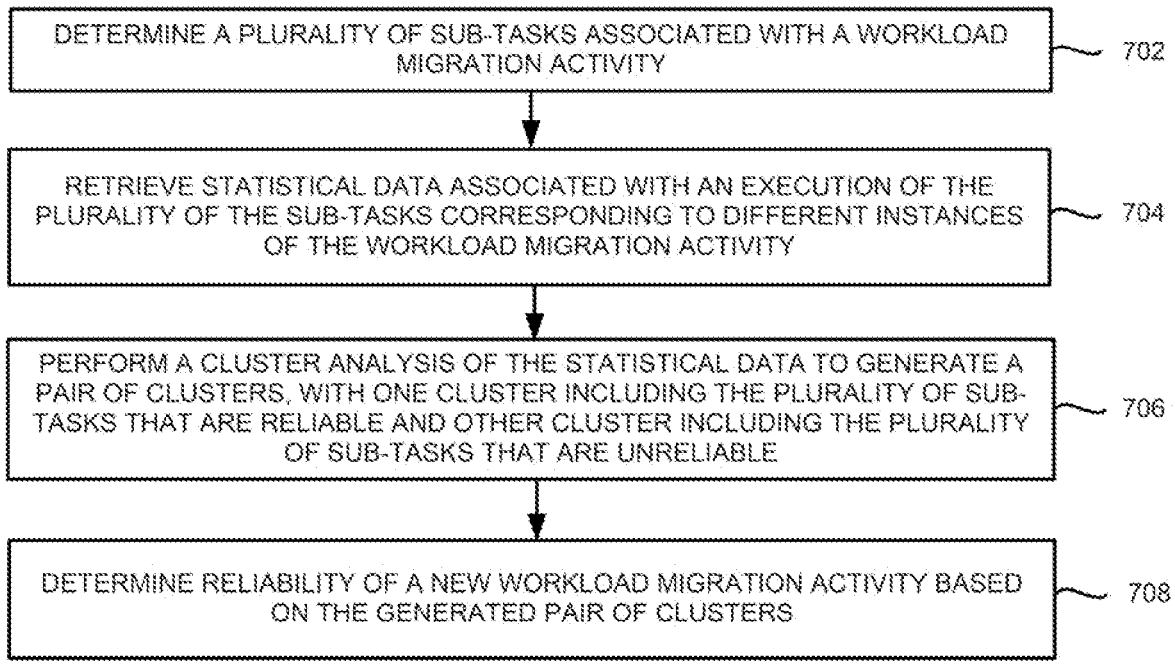
FIG. 7 is an example flow diagram illustrating determining reliability of a workload migration activity through unsupervised learning in a virtual computing environment.

FIG. 7 is an example flow diagram 700 illustrating determining reliability of a workload migration activity through unsupervised learning in a virtual computing environment. It should be understood that the process depicted in FIG. 7 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 702, a plurality of sub-tasks associated with a workload migration activity may be determined. At 704, statistical data associated with an execution of the plurality of the sub-tasks corresponding to different instances of the workload migration activity may be retrieved. At 706, a cluster analysis of the statistical data may be performed to generate a pair of clusters, with one cluster including the plurality of sub-tasks that are reliable and other cluster including the plurality of sub-tasks that are unreliable. At 708, reliability of a new workload migration activity may be determined based on the generated pair of clusters.

Figure 8:
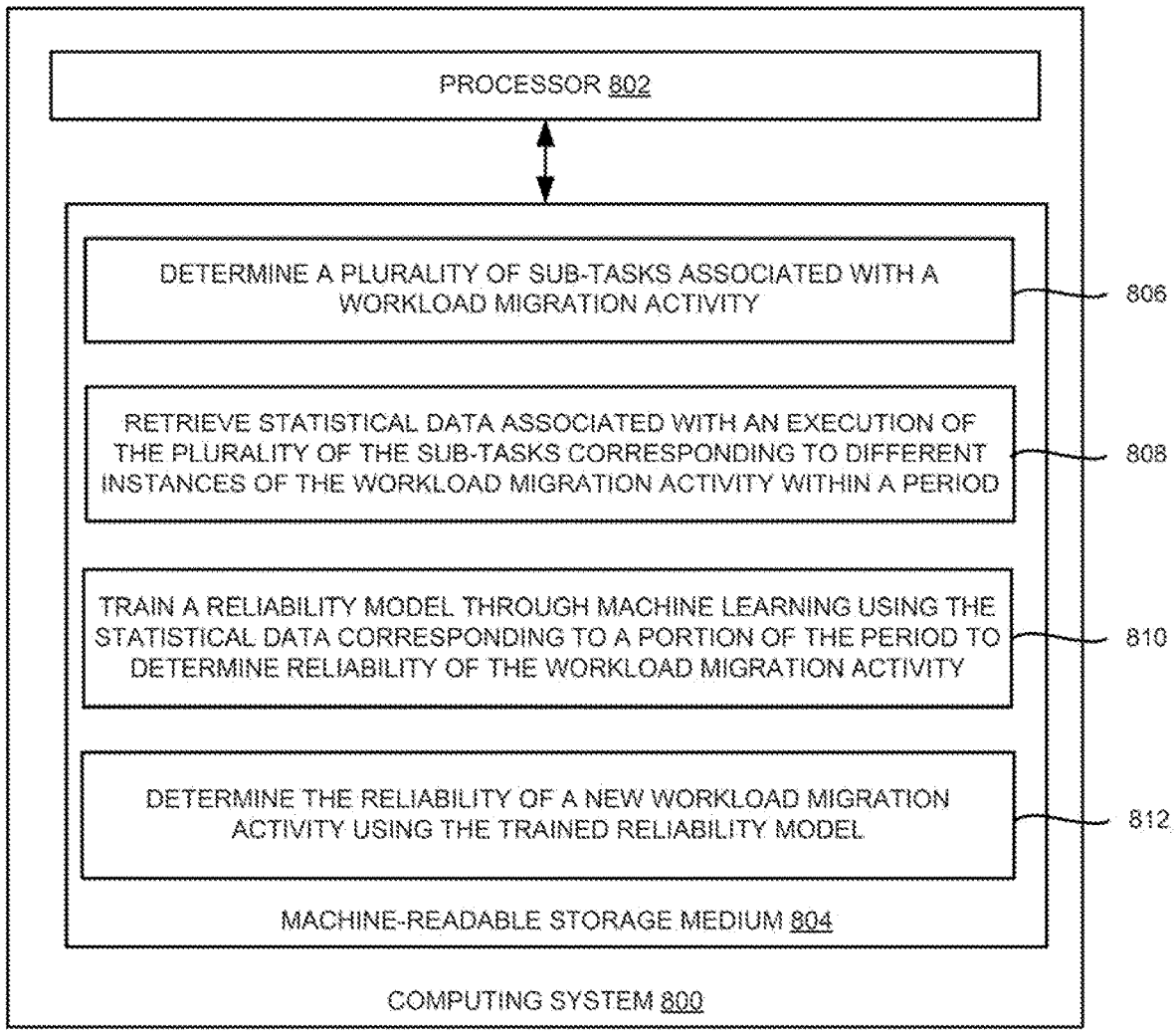
FIG. 8 is a block diagram of an example computing system including a non-transitory computer-readable storage medium, storing instructions to determine reliability of a workload migration activity through supervised learning.

FIG. 8 is a block diagram of an example computing system 800 (e.g., management unit 102 of FIG. 1) including a non-transitory computer-readable storage medium 804, storing instructions to determine reliability of a workload migration activity through supervised learning. Computing system 800 may include a processor 802 and machine-readable storage medium 804 communicatively coupled through a system bus. Processor 802 may be any type of central processing unit (CPU), microprocessor, or processing logic that interprets and executes machine-readable instructions stored in machine-readable storage medium 804. Machine-readable storage medium 804 may be a random-access memory (RAM) or another type of dynamic storage device that may store information and machine-readable instructions that may be executed by processor 802. For example, machine-readable storage medium 804 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 804 may be a non-transitory machine-readable medium. In an example, machine-readable storage medium 804 may be remote but accessible to computing system 800.

Machine-readable storage medium 804 may store instructions 806-812. In an example, instructions 806-812 may be executed by processor 802 for determining reliability of a workload migration activity through supervised learning. Instructions 806 may be executed by processor 802 to determine a plurality of sub-tasks associated with a workload migration activity. Instructions 808 may be executed by processor 802 to retrieve statistical data associated with an execution of the plurality of the sub-tasks corresponding to different instances of the workload migration activity within a period. Instructions 810 may be executed by processor 802 to train a reliability model through machine learning using the statistical data corresponding to a portion of the period to determine reliability of the workload migration activity. Further, instructions 812 may be executed by processor 802 to determine the reliability of a new workload migration activity using the trained reliability model.

Figure 9:
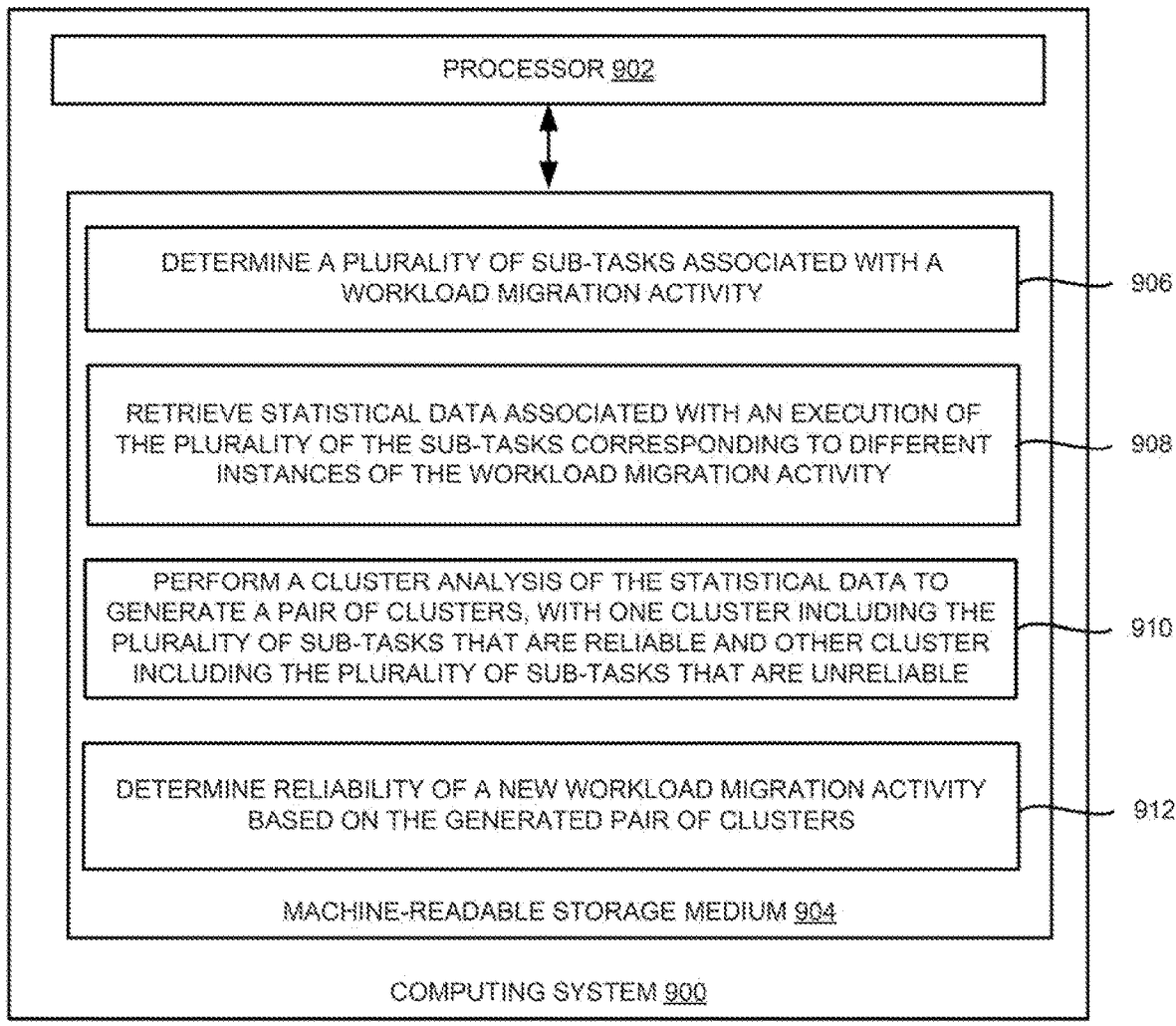
FIG. 9 is a block diagram of an example computing system including non-transitory computer-readable storage medium, storing instructions to determine reliability of a workload migration activity through unsupervised learning.

FIG. 9 is a block diagram of an example computing system 900 (e.g., management unit 402 of FIG. 4) including a non-transitory computer-readable storage medium 904, storing instructions to determine reliability of a workload migration activity through unsupervised learning. Computing system 900 may include a processor 902 and a machine-readable storage medium 904 communicatively coupled through a system bus. Processor 902 may be any type of central processing unit (CPU), microprocessor, or processing logic that interprets and executes machine-readable instructions stored in machine-readable storage medium 904. Machine-readable storage medium 904 may be a random-access memory (RAM) or another type of dynamic storage device that may store information and machine-readable instructions that may be executed by processor 902. For example, machine-readable storage medium 904 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 904 may be a non-transitory machine-readable medium. In an example, machine-readable storage medium 904 may be remote but accessible to computing system 900.

Machine-readable storage medium 904 may store instructions 906-912. In an example, instructions 906-912 may be executed by processor 902 for determining reliability of a workload migration activity through unsupervised learning. Instructions 906 may be executed by processor 902 to determine a plurality of sub-tasks associated with a workload migration activity. Instructions 908 may be executed by processor 902 to retrieve statistical data associated with an execution of the plurality of the sub-tasks corresponding to different instances of the workload migration activity. Instructions 910 may be executed by processor 902 to perform a cluster analysis of the statistical data to generate a pair of clusters, with one cluster including the plurality of sub-tasks that are reliable and other cluster including the plurality of sub-tasks that are unreliable. Further, instructions 912 may be executed by processor 902 to determine reliability of a new workload migration activity based on the generated pair of clusters.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    determining a plurality of sub-tasks associated with a workload migration activity;
    retrieving statistical data associated with an execution of the plurality of the sub-tasks corresponding to different instances of the workload migration activity;
    performing a cluster analysis of the statistical data to generate a pair of clusters, with one cluster including the plurality of sub-tasks that are reliable and other cluster including the plurality of sub-tasks that are unreliable; and
    determining reliability of a new workload migration activity based on the generated pair of clusters.

2. The method of claim 1, further comprising:
    training a reliability model through machine learning based on the generated pair of clusters to determine the reliability of the workload migration activity; and
    determining the reliability of the new workload migration activity using the trained reliability model.

3. The method of claim 1, further comprising:
    determining a root cause for an unreliable workload migration activity by sub-classifying the sub-tasks associated with the new workload migration activity using the trained reliability model when the new workload migration activity is determined as unreliable; and
    determining corrective measures for the root cause for the unreliable workload migration activity.

4. The method of claim 1, wherein the statistical data comprises an execution time of each sub-task corresponding to the different instances of the workload migration activity.

5. The method of claim 1, wherein determining reliability of the new workload migration activity comprises:
    receiving data input from an analytics agent in a host when the new workload migration activity is triggered; and
    determining the reliability of the new workload migration activity using the generated pair of clusters.

6. A management system supported by hardware in a virtual computing environment comprising:
    a retrieving unit to retrieve statistical data associated with an execution of a plurality of sub-tasks corresponding to different instances of a workload migration activity, wherein the plurality of sub-tasks is associated with the workload migration activity;
    a classification unit to perform a cluster analysis of the statistical data to generate a pair of clusters, with one cluster including the plurality of sub-tasks that are reliable and other cluster including the plurality of sub-tasks that are unreliable; and
    a reliability determination unit to determine reliability of a new workload migration activity based on the generated pair of clusters.

7. The management system of claim 6, further comprising:
    a training unit to train a reliability model through machine learning based on the generated pair of clusters to determine the reliability of the workload migration activity.

8. The management system of claim 7, wherein the reliability determination unit is to determine the reliability of the new workload migration activity using the trained reliability model.

9. A non-transitory machine-readable storage medium encoded with instructions that, when executed by a processor, cause the processor to:
    determine a plurality of sub-tasks associated with a workload migration activity;
    retrieve statistical data associated with an execution of the plurality of the sub-tasks corresponding to different instances of the workload migration activity;
    perform a cluster analysis of the statistical data to generate a pair of clusters, with one cluster including the plurality of sub-tasks that are reliable and other cluster including the plurality of sub-tasks that are unreliable; and
    determine reliability of a new workload migration activity based on the generated pair of clusters.

10. The non-transitory machine-readable storage medium of claim 9, further comprising instructions to:
    train a reliability model through machine learning based on the generated pair of clusters to determine the reliability of the workload migration activity; and
    determine the reliability of the new workload migration activity using the trained reliability model.

11. The non-transitory machine-readable storage medium of claim 9, further comprising instructions to:
    determine a root cause for an unreliable workload migration activity by sub-classifying the sub-tasks associated with the new workload migration activity using the trained reliability model when the new workload migration activity is determined as unreliable; and
    determine corrective measures for the root cause for the unreliable workload migration activity.

12. The non-transitory machine-readable storage medium of claim 9, wherein the statistical data comprises an execution time of each sub-task corresponding to the different instances of the workload migration activity.

13. The non-transitory machine-readable storage medium of claim 9, wherein determining reliability of the new workload migration activity comprises:
    receiving data input from an analytics agent in a host when the new workload migration activity is triggered; and
    determining the reliability of the new workload migration activity using the generated pair of clusters.

* * * * *